(12) United States Patent
Takeyama

(10) Patent No.: US 7,449,937 B2
(45) Date of Patent: Nov. 11, 2008

(54) POWER SUPPLY CIRCUIT

(75) Inventor: Yoshikazu Takeyama, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 30 days.

(21) Appl. No.: 11/555,390

(22) Filed: Nov. 1, 2006

(65) Prior Publication Data

US 2007/0096708 A1    May 3, 2007

(30) Foreign Application Priority Data

Nov. 2, 2005  (JP) .................. 2005-319191

(51) Int. Cl.
*G05F 1/10* (2006.01)
(52) U.S. Cl. .................. 327/536; 363/59; 363/60
(58) Field of Classification Search ............ 327/536; 363/59, 60
See application file for complete search history.

(56) References Cited

U.S. PATENT DOCUMENTS

| | | | | |
|---|---|---|---|---|
| 5,883,501 A * | 3/1999 | Arakawa | .......... | 323/222 |
| 6,151,230 A * | 11/2000 | Savelli | .......... | 363/60 |
| 6,320,457 B1 * | 11/2001 | Yang | .......... | 327/536 |
| 6,456,153 B2 * | 9/2002 | Buck et al. | .......... | 327/536 |
| 6,492,862 B2 * | 12/2002 | Nakahara | .......... | 327/536 |
| 6,538,497 B2 | 3/2003 | Thomas et al. | .......... | 327/543 |
| 6,717,458 B1 * | 4/2004 | Potanin | .......... | 327/536 |
| 6,853,567 B2 * | 2/2005 | Kwon | .......... | 363/60 |
| 6,927,620 B2 * | 8/2005 | Senda | .......... | 327/536 |
| 6,930,535 B2 * | 8/2005 | Kim | .......... | 327/536 |
| 7,102,425 B2 * | 9/2006 | Lee | .......... | 327/589 |
| 7,138,853 B2 * | 11/2006 | Kim et al. | .......... | 327/536 |
| 7,245,176 B2 * | 7/2007 | Do | .......... | 327/536 |

FOREIGN PATENT DOCUMENTS

JP    2003-208794    7/2003

* cited by examiner

*Primary Examiner*—Kenneth B. Wells
(74) *Attorney, Agent, or Firm*—Oblon, Spivak, McClelland, Maier & Neustadt, P.C.

(57) ABSTRACT

A power supply circuit, comprises a booster circuit that boosts the voltage supplied from a power supply to produce an output voltage; a voltage divider circuit that divides said output voltage by resistive division and outputs a monitored voltage; a comparator circuit that compares said monitored voltage with a reference voltage and outputs a signal to activate said booster circuit if said monitored voltage is lower than said reference voltage and a signal to deactivate said booster circuit if said monitored voltage is higher than said reference voltage; an auxiliary instruction circuit that outputs an auxiliary signal to control the timing of the activation of said booster circuit; and an arithmetic circuit that performs a calculation using said auxiliary signal and the output signal of said comparator circuit and outputs an enable signal to activate said booster circuit if the output signal of said comparator circuit is a signal to activate said booster circuit, or said auxiliary signal is a signal to activate said booster circuit.

11 Claims, 6 Drawing Sheets

POWER SUPPLY CIRCUIT

CROSS-REFERENCE TO RELATED APPLICATION

This application is based upon and claims the benefit of priority from the prior Japanese Patent Application No. 2005-319191, filed on Nov. 2, 2005, the entire contents of which are incorporated herein by reference.

BACKGROUND OF THE INVENTION

1. Field of the Invention

The present invention relates to a power supply circuit provided with a booster circuit that boosts the power supply voltage.

2. Background of the Invention

There already exists a power supply circuit that boosts the power supply voltage before supplying the voltage to a nonvolatile semiconductor memory device, such as a NAND-type EEPROM.

Such a conventional power supply circuit has a booster circuit that boosts the voltage supplied from a power supply to produce an output voltage, a resistor circuit for monitoring the output voltage, and a comparator/detector circuit that outputs a signal indicating whether to activate or deactivate the booster circuit based on the value of the monitored voltage provided by the resistor circuit (see Japanese Patent Laid-Open No. 2003-199329, for example).

If the output voltage decreases because of a load connected to the power supply circuit, the comparator/detector circuit detects the decrease in voltage and outputs a signal to activate the booster circuit, and the booster circuit boosts the voltage. In this way, the power supply voltage can restore the voltage to a desired value.

However, there is a certain time lag between the time when the load is connected to the power supply circuit and the time when the comparator/detector circuit detects the decrease in voltage and outputs the signal to activate the booster circuit. The time lag is determined by the activation time constant, which is determined by the resistance of the resistor circuit, and the response time of the comparator/detector circuit.

To reduce the current consumption, the resistor circuit of the conventional power supply circuit has a resistor having an extremely high resistance, thereby minimizing the value of the current flowing through the resistor circuit. Therefore, there is a problem that the time constant, which is determined by the resistance, is large, and it takes a quite long time to restore the output voltage to a set potential.

To shorten the time to restore the output voltage, the resistance of the resistor circuit can be reduced to reduce the activation time constant of the voltage detector circuit, thereby shortening the response time. However, in this case, the leak current from the output of the booster circuit increases.

Alternatively, the capacity for boosting can be increased to enhance the capability of the booster circuit, thereby shortening the time to restore the output voltage. However, the size of the booster circuit increases, and the area for the booster circuit will also be increased.

SUMMARY OF THE INVENTION

According one aspect of the present invention, there is provided: A power supply circuit, comprising a booster circuit that boosts the voltage supplied from a power supply to produce an output voltage; a voltage divider circuit that divides said output voltage by resistive division and outputs a monitored voltage; a comparator circuit that compares said monitored voltage with a reference voltage and outputs a signal to activate said booster circuit if said monitored voltage is lower than said reference voltage and a signal to deactivate said booster circuit if said monitored voltage is higher than said reference voltage; an auxiliary instruction circuit that outputs an auxiliary signal to control the timing of the activation of said booster circuit; and an arithmetic circuit that performs a calculation using said auxiliary signal and the output signal of said comparator circuit and outputs an enable signal to activate said booster circuit if the output signal of said comparator circuit is a signal to activate said booster circuit, or said auxiliary signal is a signal to activate said booster circuit.

DETAILED DESCRIPTION

In the following, embodiments of the present invention will be described with reference to the drawings.

First Embodiment

Figure 1:
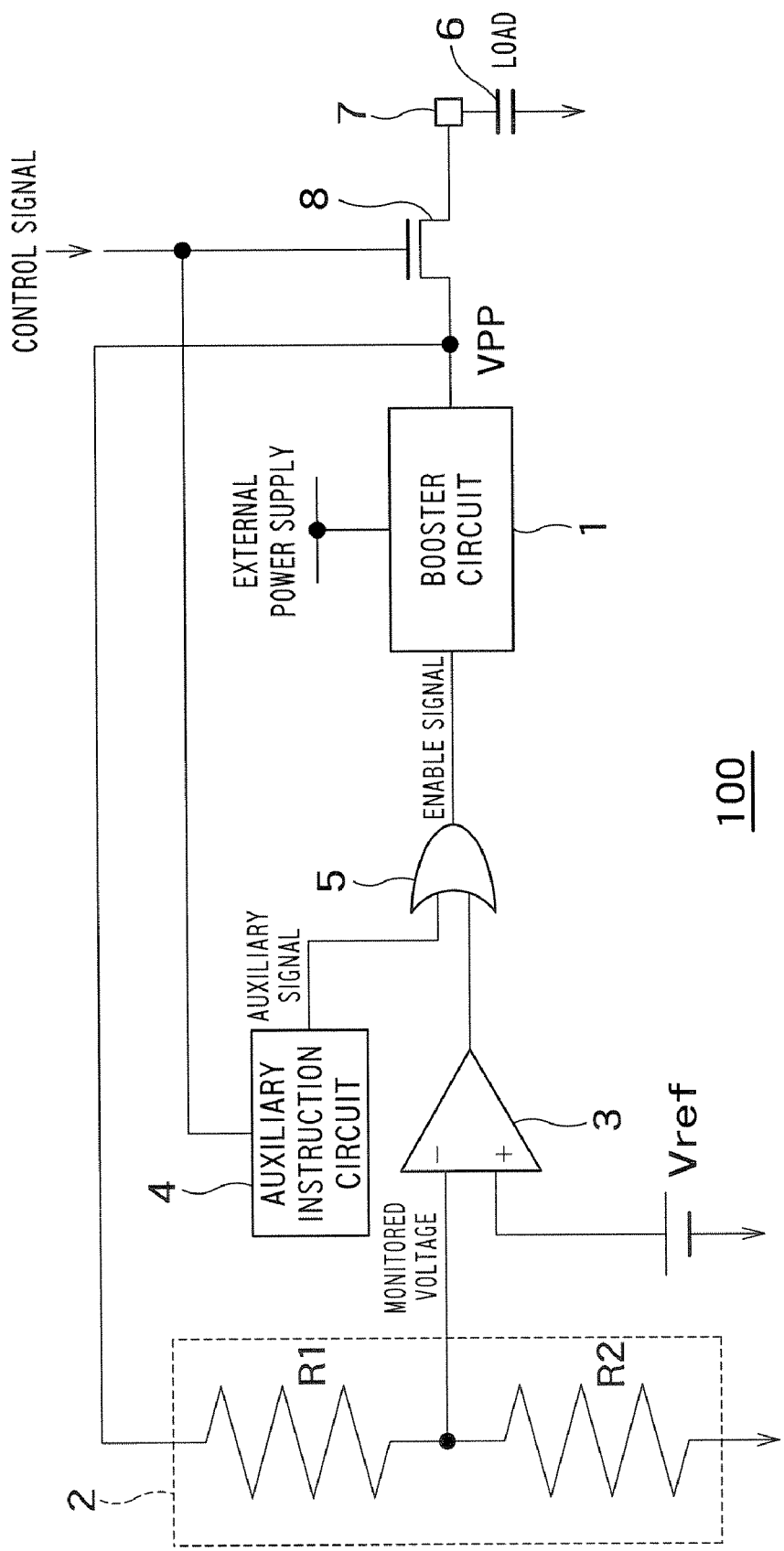
FIG. 1 is a diagram showing essential parts of a power supply circuit according to a first embodiment of the present invention, which is an aspect of the present invention.
Figure 2:
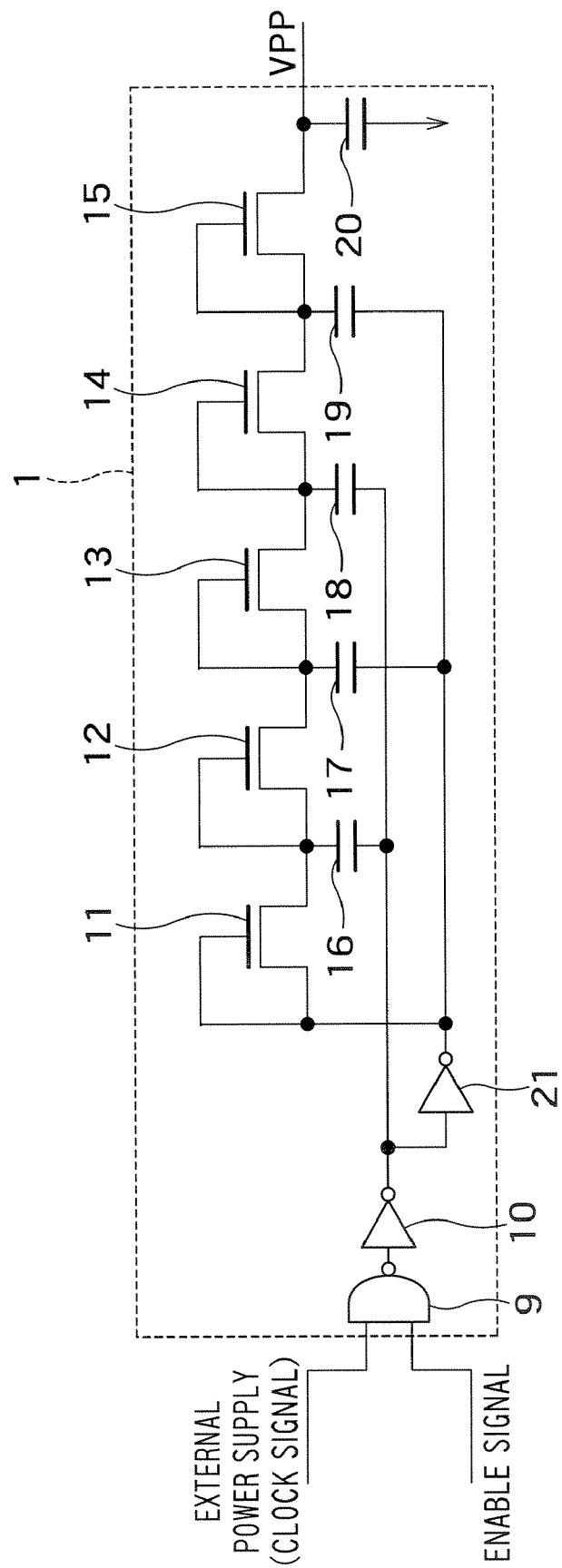
FIG. 2 is a diagram showing an exemplary booster circuit used in the power supply circuit shown in FIG. 1.
Figure 3:
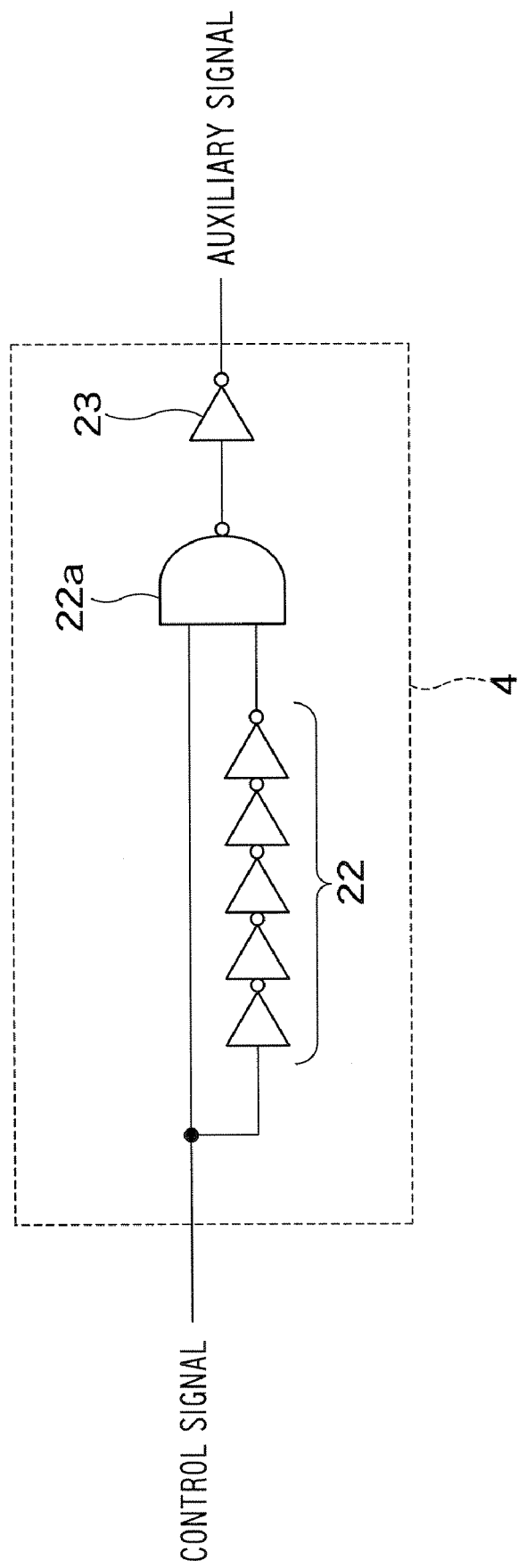
FIG. 3 is a diagram showing an exemplary auxiliary instruction circuit used in the power supply circuit shown in FIG. 1.

FIG. 1 is a diagram showing essential parts of a power supply circuit 100 according to a first embodiment of the present invention, which is an aspect of the present invention. FIG. 2 is a diagram showing an exemplary booster circuit used in the power supply circuit shown in FIG. 1. FIG. 3 is a diagram showing an exemplary auxiliary instruction circuit used in the power supply circuit shown in FIG. 1.

As shown in FIG. 1, the power supply circuit 100 has a booster circuit 1 that boosts the voltage supplied from a power supply to produce an output voltage, a voltage divider circuit 2 that divides the output voltage by resistive division by two resistors R1 and R2, for example, and outputs a monitored voltage, and a comparator circuit 3 that compares the monitored voltage with a reference voltage Vref and outputs a signal to control whether to activate (carry out a boost operation of) or deactivate (stop a boost operation of) the booster circuit 1.

In addition, the power supply circuit 100 has an auxiliary instruction circuit 4 that outputs an auxiliary signal to control the timing of activation/deactivation of the booster circuit 1, an arithmetic circuit 5 that performs a calculation based on the auxiliary signal and the output signal of the comparator circuit 3 and outputs an enable signal to activate or deactivate the booster circuit 1, and a switch circuit 8 disposed between the output of the booster circuit 1 and an output terminal 7 to which a load 6, to which an output voltage VPP is to be supplied, is connected.

As shown in FIG. 2, for example, the booster circuit 1 has a NAND circuit 9 that receives the enable signal and a clock signal, an inverter circuit 10 that inverts the output of the NAND circuit 9, and MOS transistors 11 to 15 that are connected in series to each other with the source of each MOS transistor connected to the gate of the adjacent one.

In addition, the booster circuit 1 has capacitors 16 to 19 connected to the drains of the MOS transistors 11 to 14, a capacitor 20 connected to the drain of the MOS transistor 15 that serves as the output of the booster circuit 1, and an inverter circuit 21 that inverts the output of the inverter circuit 10.

The output of the inverter circuit 10 is connected to the capacitors 16 and 18, and the output of the inverter circuit 21 is connected to the source of the MOS transistor 11 and the capacitors 17 and 19. Thus, for example, if the enable signal is a signal to activate the booster circuit 1 (or if the signal level thereof is "high" or logic "1"), when a desired clock signal is input to the NAND circuit 9, the MOS transistors 11 to 14 operate alternately, and the capacitors 16 to 20 are successively charged and boosted.

As a result, the voltage stored in the capacitor 20 is output as the output voltage VPP.

As described above, the boost capability of the booster circuit 1 can be enhanced by increasing the capacitance of the capacitors 16 to 19. However, in this case, the footprint of the booster circuit increases. The booster circuit 1 shown in FIG. 2 is only an illustrative one, and according to this embodiment, any booster circuit can be used that boosts the power supply voltage to be output based on the enable signal input thereto.

If the monitored voltage is lower than the reference voltage Vref, the comparator circuit 3 outputs a signal to activate the booster circuit 1. If the monitored voltage is higher than the reference voltage Vref, the comparator circuit outputs a signal to deactivate the booster circuit 1. Adjusting the reference voltage Vref allows the output voltage VPP to be boosted at a desired value.

As shown in FIG. 3, for example, the auxiliary instruction circuit 4 has a NAND circuit 22a that receives a control signal, a delay circuit 22 that is composed of an odd number of inverter circuits connected in series, inverts the control signal and outputs the inverted control signal to the NAND circuit 22a after a delay of a desired length of time, and an inverter circuit 23 that inverts the output of the NAND circuit 22a and outputs an auxiliary signal.

The auxiliary instruction circuit 4, which outputs the auxiliary signal based on the input control signal that controls whether to turn on or off the switch circuit 8, can output the auxiliary signal after a desired delay from input of the control signal. The delay can be easily increased by increasing the number of inverter circuits in the delay circuit 22, for example.

The auxiliary instruction circuit 4 shown in FIG. 3 is only an illustrative one and may be any other logic circuit that can serve similar functions.

The arithmetic circuit 5 is composed of an OR circuit, for example. If the output signal of the comparator circuit 3 is a signal to activate the booster circuit 1 (or if the signal level thereof is "high" or logic "1"), or the auxiliary signal is a signal to activate the booster circuit 1 (or if the signal level thereof is "high" or logic "1"), the arithmetic circuit 5 outputs the enable signal to activate the booster circuit 1 (or the enable signal whose signal level is "high" or logic "1").

On the other hand, if the output signal of the comparator circuit 3 is a signal to deactivate the booster circuit 1 (or if the signal level thereof is "low" or logic "0"), and the auxiliary signal is a signal to deactivate the booster circuit 1 (or if the signal level thereof is "low" or logic "0"), the arithmetic circuit 5 outputs the enable signal to deactivate the booster circuit 1.

The load 6 may be a nonvolatile semiconductor memory device, such as a NAND cell type EEPROM, a NOR cell type EEPROM, a DINOR cell type EEPROM and an AND cell type EEPROM, and a circuit that requires a voltage higher than the power supply voltage.

For example, the switch circuit 8 is an element or circuit that can turn on and off the voltage supply, such as an MOS transistor, and is turned on and off under the control of the control signal described above. For example, if the switch circuit 8 receives a control signal to energize or turn on the load 6 (or a control signal whose signal level is "high"), the switch circuit 8 constituted by an MOS transistor is turned on to be conductive, thereby supplying the voltage VPP to the load 6.

Figure 4:
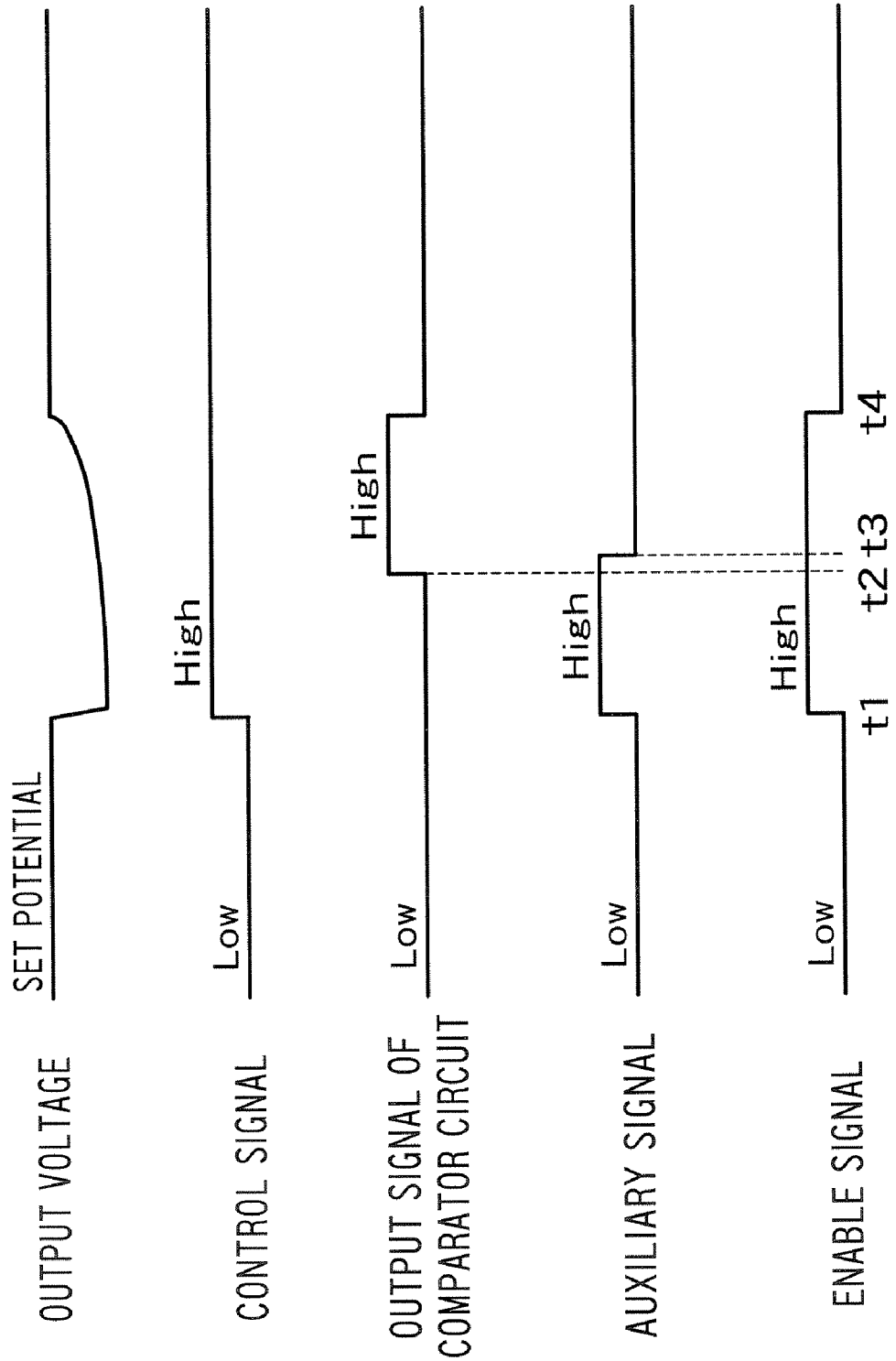
FIG. 4 is a timing diagram showing waveforms of signals to control the boost operation of the power supply circuit according to the first embodiment of the present invention.

Now, a boost operation of the power supply circuit 100 configured as described above will be described. FIG. 4 is a timing diagram showing waveforms of signals to control the boost operation of the power supply circuit 100 according to the first embodiment of the present invention.

As shown in FIG. 4, in an initial state where the control signal is at the "low" level, that is, the switch circuit 8 is in the off state, and no voltage is supplied to the load 6, the output voltage is kept at the desired voltage value VPP, and the other signals are also at the "low" level.

First, at a time t1, the control signal changes from the "low" level to the "high" level, and the switch circuit 8 is turned on to supply the voltage to the load 6. Accordingly, the output voltage decreases to a potential determined by the capacitance ratio between the load 6 and the booster circuit 1. Then, the voltage divider circuit 2 gradually decreases the monitored voltage. However, since the resistors R1 and R2 have a high resistance in order to reduce current consumption and thus have a large activation time constant, and the comparator circuit 3 requires a certain response time, there occurs a delay after the output voltage VPP starts decreasing until signal response occurs.

When the control signal changes from the "low" level to the "high" level, that is, when the switch circuit 8 is turned on, the auxiliary instruction circuit 4 outputs the auxiliary signal ("high") to activate the booster circuit 1. Based on the output, the arithmetic circuit 5 outputs the enable signal ("high") to activate the booster circuit 1. In response to reception of the enable signal, the booster circuit 1 is activated to start the boost operation. Thus, compared with the prior art, the decrease in output voltage VPP can be reduced, and the output voltage VPP can be restored in a short time.

If the auxiliary instruction circuit 4 outputs the auxiliary signal ("high") to activate the booster circuit 1 after the switch circuit 8 is turned on and before the comparator circuit 3 outputs the signal ("high") to activate the booster circuit 1, the decrease in output voltage VPP can be reduced, and the output voltage VPP can be restored in a short time compared with the prior art.

Then, at a time t2 after the delay described above determined by the activation time constant of the voltage divider circuit 2, the response time of the comparator circuit 3 and the like, the comparator circuit 3 outputs the signal ("high") to activate the booster circuit 1.

Then, after a lapse of a desired time from the time t1 (at a time t3), or in other words, after the comparator circuit 3 outputs the signal ("high") to activate the booster circuit 1, the auxiliary instruction circuit 4 outputs the auxiliary signal ("low") to deactivate the booster circuit 1. This makes the arithmetic circuit 5 continue outputting the enable signal ("high") to activate the booster circuit 1. As a result, the booster circuit 1 continues carrying out the boost operation. In addition, the auxiliary instruction circuit 4 outputs the auxiliary signal ("low") to deactivate the booster circuit 1 before the comparator circuit 3 outputs the signal ("low") to deactivate the booster circuit 1.

Then, at a time t4, the comparator circuit 3 detects that the monitored voltage output from the voltage divider circuit 2 and increasing due to the increase in output voltage VPP becomes higher than the reference voltage Vref, and outputs the signal ("low") to deactivate the booster circuit 1. This makes the arithmetic circuit 5 to output the enable signal ("low") to deactivate the booster circuit 1. In response to reception of the enable signal, the booster circuit 1 is deactivated to stop the boost operation. At this point in time, the auxiliary instruction circuit 4 has already output the signal ("low") to deactivate the booster circuit 1, and the enable signal from the arithmetic circuit 5 is associated with the change of the output signal of the comparator circuit 3 from "high" to "low". Thus, any unwanted boost operation by the booster circuit 1 is prevented.

As described above, the power supply circuit according to the present invention can activate the booster circuit at a desired time under the control of the auxiliary instruction circuit, without reducing the resistance of the voltage divider circuit to reduce the activation time constant or increasing the capacitance to enhance the boost capability of the booster circuit.

Therefore, the booster circuit can be made to carry out the boost operation at a desired time, and the output voltage can be restored quickly while reducing the increase in current leak and in footprint of the circuit.

Second Embodiment

In the first embodiment described above, the power supply circuit has the voltage divider circuit that divides the output voltage VPP by resistive division and outputs the monitored voltage. However, according to a second embodiment described below, the voltage divider circuit has a variable resistor to carry out resistive division, and the voltage division ratio varies.

Figure 5:
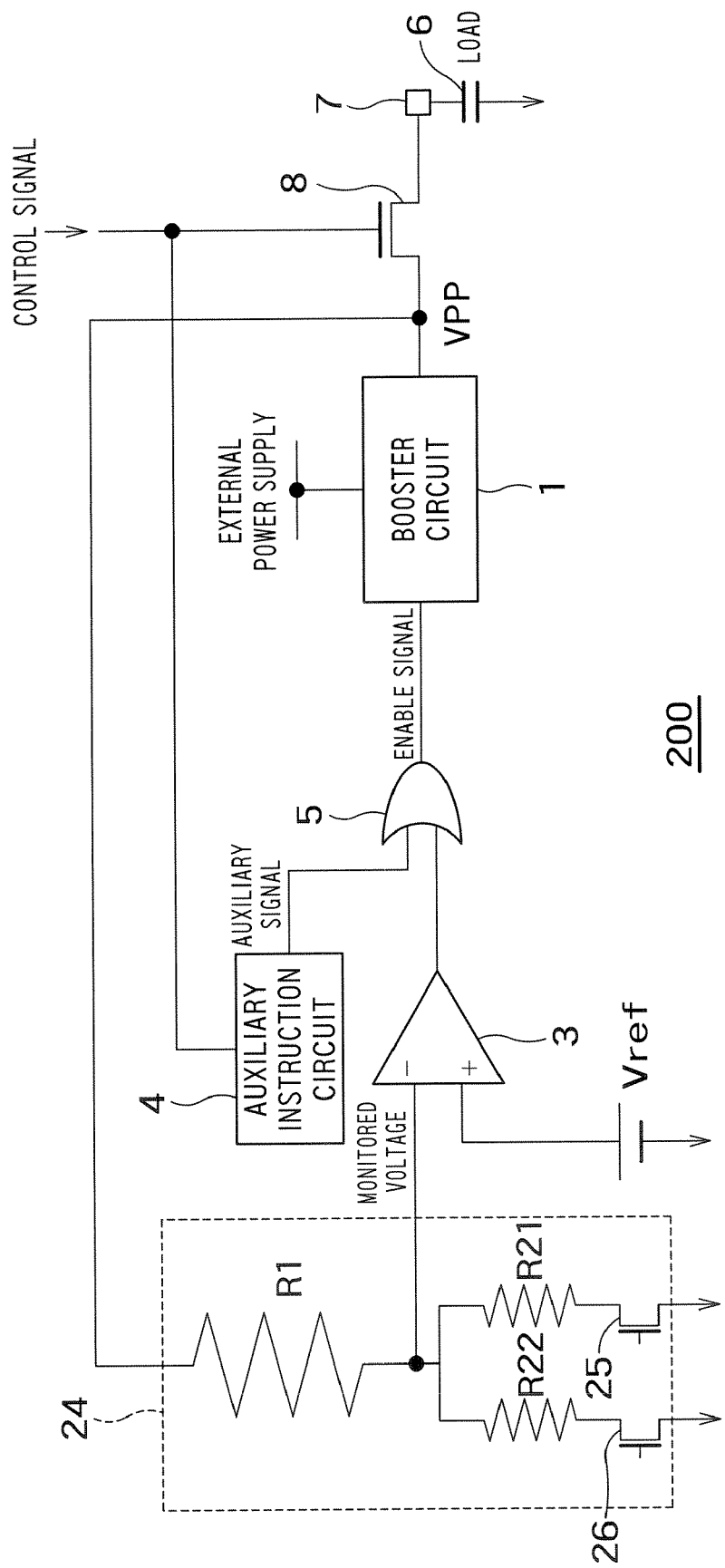
FIG. 5 is a diagram showing essential parts of a power supply circuit according to the second embodiment of the present invention, which is an aspect of the present invention.

FIG. 5 is a diagram showing essential parts of a power supply circuit 200 according to the second embodiment of the present invention, which is an aspect of the present invention. The same reference numerals as those used in the first embodiment denote the same parts as those according to the first embodiment.

As shown in FIG. 5, a voltage divider circuit 24 of the power supply circuit 200 has a resistor R1 connected to the output of the booster circuit 1, resistors R21 and R22 connected in parallel between the resistor R1 and the ground, and switch circuits 25 and 26 connected in series with the resistors R21 and R22, respectively. Thus, the voltage divider circuit 24 has a variable resistor to divide the output voltage. The monitored voltage is output from the point of connection of the resistor R1 to the resistors R21 and R22.

The resistors R21 and R22 have different resistances. For example, in order to adjust the voltage division ratio to a desired value to meet specifications, such as the target value of the output voltage VPP to be boosted, the switch circuits 25 and 26 can be turned on or off. In response to this, the time for the comparator circuit 3 to output the signal "high" to activate the booster circuit 1 and the signal "low"" to deactivate the booster circuit 1 shown in FIG. 4 is changed.

If the time for the auxiliary instruction circuit 4 to output the auxiliary signal ("low") to deactivate the booster circuit 1 is appropriately changed, the booster circuit 1 can be made to carry out a desired boost operation as in the first embodiment. The time of output of the auxiliary signal ("low") to deactivate the booster circuit 1 can be adjusted by changing the number of inverter circuits in the delay circuit 22 shown in FIG. 3 described above, for example.

In particular, if the set output potential of the booster circuit 1 is low, the output capability of the booster circuit 1 is high. Thus, the pulse width of the auxiliary signal output from the auxiliary instruction circuit 4 is too wide, so that an overshoot can occur in the output of the booster circuit 1. Therefore, when the set output potential of the booster circuit 1 is low, it is preferably provided that the delay (the number of inverter circuits), which determines the pulse width of the auxiliary signal output from the auxiliary instruction circuit 4, can be appropriately finely changed.

As described above, the power supply circuit according to this embodiment can make the booster circuit carry out the boost operation at a desired time and restore the output voltage quickly as in the first embodiment, although the voltage divider circuit is composed of a variable resistor, and the voltage division ratio varies.

Third Embodiment

In the first embodiment described above, one kind of load is connected to the output terminal. However, according to a third embodiment described below, the output voltage is selectively supplied to a plurality of loads connected to a plurality of output terminals.

Figure 6:
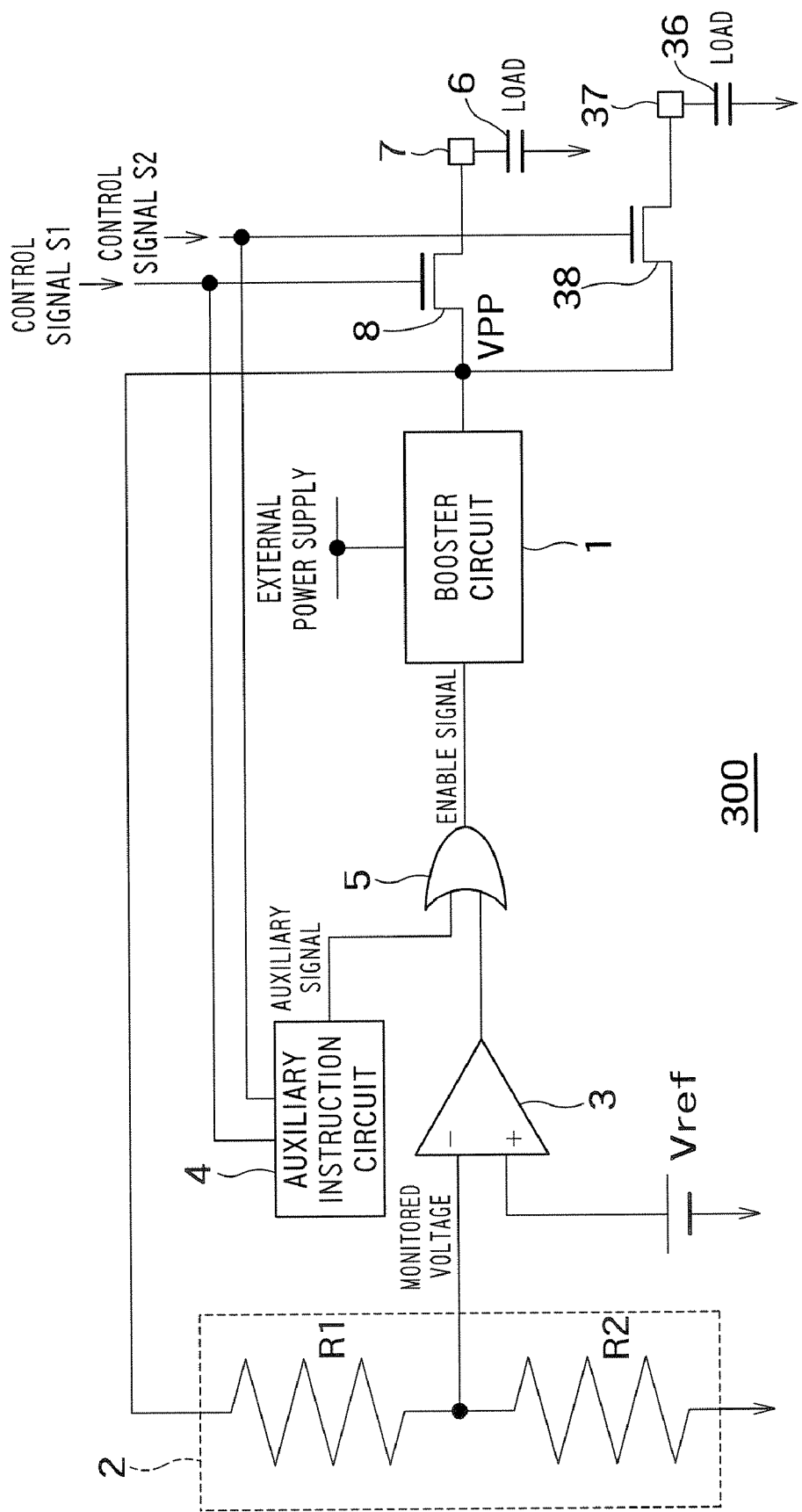
FIG. 6 is a diagram showing essential parts of a power supply circuit according to the third embodiment of the present invention, which is an aspect of the present invention.

FIG. 6 is a diagram showing essential parts of a power supply circuit 300 according to the third embodiment of the present invention, which is an aspect of the present invention. The same reference numerals as those used in the first embodiment denote the same parts as those according to the first embodiment.

As shown in FIG. 6, the power supply circuit 300 further has a switch circuit 38 disposed between the output of the booster circuit 1 and an output terminal 37 to which a load 36 having a capacitance different from that of a load 6 is connected.

A switch circuit 8 is turned on and off under the control of a control signal S1, and the switch circuit 38 is turned on and off under the control of a control signal S2. Thus, the output voltage can be selectively supplied to the loads 6 and 36.

In the case where the output voltage is selectively supplied to the loads 6 and 36, since the loads 6 and 36 have different capacitances as described above, the time required for the booster circuit 1 to restore the output voltage VPP by the boost operation after the output voltage decreases also differs between the loads 6 and 36. In other words, the time for the comparator circuit 3 shown in FIG. 4 to output the signal "high" to activate the booster circuit 1 and the signal "low" to deactivate the booster circuit 1 varies.

If the time for the auxiliary instruction circuit 4 to output the auxiliary signal ("low") to deactivate the booster circuit 1 is appropriately changed, the booster circuit 1 can be made to carry out a desired boost operation as in the first embodiment. The time of output of the auxiliary signal ("low") to deactivate the booster circuit 1 can be adjusted by changing the number of inverter circuits in the delay circuit 22 shown in FIG. 3 described above, for example.

As described above, the power supply circuit according to this embodiment can make the booster circuit carry out the boost operation at a desired time and restore the output voltage quickly as in the first embodiment, although the output voltage is selectively supplied to a plurality of loads connected to a plurality of output terminals.

In the embodiments described above, the auxiliary instruction circuit generates and outputs the auxiliary signal based on the control signal(s) for controlling the switch circuit(s). However, for example, the auxiliary instruction circuit may generate and output an auxiliary signal based on another control signal output from another circuit, an external device or the like, or may output the another control signal input thereto as an auxiliary signal without change.

In addition, in the embodiments described above, the booster circuit is activated to start the boost operation after the switch circuit is turned on. However, the booster circuit may be activated before the switch circuit is turned on and carry out the boost operation to the extent that the output voltage is not excessively boosted. In this case, the output voltage can be restored more quickly.

What is claimed is:

1. A power supply circuit comprising:
   a booster circuit that boosts the voltage supplied from a power supply to produce an output voltage;
   a voltage divider circuit that divides said output voltage by resistive division and outputs a monitored voltage;
   a comparator circuit that compares said monitored voltage with a reference voltage and outputs a signal to activate said booster circuit if said monitored voltage is lower than said reference voltage and a signal to deactivate said booster circuit if said monitored voltage is higher than said reference voltage;
   an auxiliary instruction circuit that outputs an auxiliary signal to control the timing of the activation of said booster circuit;
   an arithmetic circuit that performs a calculation using said auxiliary signal and the output signal of said comparator circuit and outputs an enable signal to activate said booster circuit if the output signal of said comparator circuit is a signal to activate said booster circuit, or said auxiliary signal is a signal to activate said booster circuit; and
   a switch circuit disposed between the output of said booster circuit and an output terminal to which a load to which said output voltage is to be supplied is connected,
   wherein said auxiliary instruction circuit outputs the auxiliary signal to activate said booster circuit between the time when said switch circuit is turned on and the time when said comparator circuit outputs the signal to activate said booster circuit.

2. The power supply circuit according to claim 1, wherein said auxiliary instruction circuit outputs the auxiliary signal to activate said booster circuit when said switch circuit is turned on.

3. The power supply circuit according to claim 1, wherein said auxiliary instruction circuit outputs the auxiliary signal to deactivate said booster circuit after said comparator circuit outputs the signal to activate said booster circuit.

4. The power supply circuit according to claim 2, wherein said auxiliary instruction circuit outputs the auxiliary signal to deactivate said booster circuit after said comparator circuit outputs the signal to activate said booster circuit.

5. The power supply circuit according to claim 1, wherein said arithmetic circuit outputs the enable signal to deactivate said booster circuit if the output signal of said comparator circuit is a signal to deactivate said booster circuit, and said auxiliary signal is a signal to deactivate said booster circuit, and
   said auxiliary instruction circuit outputs the auxiliary signal to deactivate said booster circuit before said comparator circuit outputs the signal to deactivate said booster circuit.

6. The power supply circuit according to claim 1, wherein said arithmetic circuit outputs the enable signal to deactivate said booster circuit if the output signal of said comparator circuit is a signal to deactivate said booster circuit, and said auxiliary signal is a signal to deactivate said booster circuit, and
   said auxiliary instruction circuit outputs the auxiliary signal to deactivate said booster circuit before said comparator circuit outputs the signal to deactivate said booster circuit.

7. The power supply circuit according to claim 2, wherein said arithmetic circuit outputs the enable signal to deactivate said booster circuit if the output signal of said comparator circuit is a signal to deactivate said booster circuit, and said auxiliary signal is a signal to deactivate said booster circuit, and
   said auxiliary instruction circuit outputs the auxiliary signal to deactivate said booster circuit before said comparator circuit outputs the signal to deactivate said booster circuit.

8. The power supply circuit according to claim 3, wherein said arithmetic circuit outputs the enable signal to deactivate said booster circuit if the output signal of said comparator circuit is a signal to deactivate said booster circuit, and said auxiliary signal is a signal to deactivate said booster circuit, and
   said auxiliary instruction circuit outputs the auxiliary signal to deactivate said booster circuit before said comparator circuit outputs the signal to deactivate said booster circuit.

9. The power supply circuit according to claim 4, wherein said arithmetic circuit outputs the enable signal to deactivate said booster circuit if the output signal of said comparator circuit is a signal to deactivate said booster circuit, and said auxiliary signal is a signal to deactivate said booster circuit, and
   said auxiliary instruction circuit outputs the auxiliary signal to deactivate said booster circuit before said comparator circuit outputs the signal to deactivate said booster circuit.

10. The power supply circuit according to claim 1, wherein said auxiliary instruction circuit has an odd number of inverter circuits connected in series with each other to which a control signal to turn on/off said booster circuit is input, a NAND circuit to which said control signal and the output signal of said inverter circuits is input, and an inverter that is connected to the output of the NAND circuit and outputs said auxiliary signal.

11. The power supply circuit according to claim 1, wherein said voltage divider circuit is composed of a variable resistor to divide said output voltage.

* * * * *